United States Patent [19]

Gervais et al.

[11] Patent Number: 5,014,141
[45] Date of Patent: May 7, 1991

[54] LOW PROFILE, HIGH-CAPACITY STREAMING TAPE DRIVE

[75] Inventors: William J. Gervais, Northridge; Richard A. Nelson, Burbank, both of Calif.

[73] Assignee: Qualstar Corporation, Northridge, Calif.

[21] Appl. No.: 421,404

[22] Filed: Oct. 13, 1989

[51] Int. Cl.$^5$ ............................................. G11B 15/38
[52] U.S. Cl. ................................... 360/96.1; 360/95; 360/96.5; 360/137; 242/195
[58] Field of Search ..................... 360/96.1, 96.3, 96.5, 360/95, 90, 137; 242/182, 195

[56] References Cited

U.S. PATENT DOCUMENTS

| | | | |
|---|---|---|---|
| 3,863,863 | 2/1975 | Ende | 242/182 |
| 3,910,526 | 10/1975 | Mosciatti | 242/182 |
| 3,918,092 | 11/1975 | Rueger | 360/85 |
| 4,243,186 | 1/1981 | Peter et al. | 242/195 |
| 4,777,548 | 10/1988 | Dow et al. | 360/96.5 |
| 4,779,150 | 10/1988 | Grant | 360/95 X |
| 4,787,571 | 11/1988 | Kosugi et al. | 242/195 |

FOREIGN PATENT DOCUMENTS

3327123A1 2/1984 Fed. Rep. of Germany.

Primary Examiner—John H. Wolff
Attorney, Agent, or Firm—Poms, Smith, Lande & Rose

[57] ABSTRACT

A low profile, high-capacity streaming tape drive system primarily for rack-mounted applications has a height of less than six inches, and a weight of less than 60 pounds. The main base plate of the tape drive has downwardly extending short tubes upon which the motors for the supply reel, the take-up reel and for the loading and cooling blower are mounted. The stator of each motor may be mounted on the outside of the associated tube, and the main drive shaft for the motor may be mounted on bearings within the tube and a permanent magnet rotor mounted by a cup-shaped member is arranged to rotate around the stator, thus providing motors which take up very little vertical height. Air ducts for cooling and for automatically threading the tape from the supply reel to the take-up reel are formed by integral ridges on the top and bottom of the main base plate forming U-shaped channels which are closed by sheet metal strips. A read formatter including microprocessor controlled error detection and correction circuity may be used to further reduce the size and weight of the unit.

22 Claims, 6 Drawing Sheets

LOW PROFILE, HIGH-CAPACITY STREAMING TAPE DRIVE

RELATED PATENT APPLICATIONS

The system of the present invention may utilize certain aspects of the system of U.S. patent application Ser. No. 185,793, filed Apr. 25, 1988, now U.S. Pat. No. 4,893,312, granted Jan. 9, 1990.

FIELD OF THE INVENTION

This invention relates to high-speed, high-capacity streaming tape drives for storing digital information.

BACKGROUND OF THE INVENTION

One form of streaming tape drive is disclosed in patent application Ser. No. 185,793, filed Apr. 25, 1988, now U.S. Pat. No. 4,893,312 assigned to the assignee of this invention, and is sold by Qualstar Corporation, 9621 Irondale Avenue, Chatsworth, Calif. 91311, as Model 1260. This is a nine-track tape drive with special error checking and tabular error syndrome correction circuitry, and has a data format which is IBM/ANSI compatible. The storage density involves 6,250 characters per inch, at a tape speed of 12.5 inches per second.

There are commercially available rack-mounted, streaming tape drive units which operate at higher speeds, for example, at speeds up to 125 inches per second. However, the commercially available units are relatively massive and heavy, having rack heights of 14 inches, or $8\frac{3}{4}$ inches, for specific examples, and weights of more than 100 pounds. In this regard, it is noted that rack-mounted electronic equipment is normally 19 inches wide and has a height which is measured in increments of $1\frac{3}{4}$ inches. The rack-mounted unit mentioned above which has a height of 14 inches involves eight increments of $1\frac{3}{4}$ inches; and the units which are $8\frac{3}{4}$ inches high each include five increments.

Accordingly, a principle object of the present invention is to significantly reduce the height of rack-mounted streaming tape drives which have high data densities and speeds, and self-threading capabilities.

Self-threading of the tape between a supply reel and the take-up reel is a desirable feature of tape drives, and this is accomplished in prior units by large special ducts mounted below a main base plate, using a constant speed blower which blows or sucks the tape through a tape path from the supply reel past the read/write head to the take-up reel.

A supplemental object of the present invention is to reduce the size, weight and noise of the blower and associated ducts.

SUMMARY OF THE INVENTION

In accordance with an important feature of the present invention, the height of a high-density, high-speed streaming tape drive of the rack mounted type and including self-threading, has been reduced to $5\frac{1}{4}$ inches, or only three increments of $1\frac{3}{4}$ inches. Further, the weight of the unit has been reduced to substantially less than sixty pounds.

In accordance with one aspect of the present invention, brushless DC drive motors are provided; and the stator and rotor of such motors for the two reels and the blower of a tape drive of the present type are mounted directly from the main support base plate of the unit. This arrangement is preferably implemented by providing short downwardly extending tubes, cast integral with the main drive base plate; mounting the stator of each motor on the outside of the tube, and mounting bearings for the rotor shaft on the inside of the tube, such that minimum axial length is used, with the permanent magnet rotor mounted on the central rotor drive shaft by a cup-shaped shell which supports the permanent magnets of the rotor in coupling proximity around the periphery of the stator. Brushless commutation may be accomplished in any known manner, using Hall effect sensors for example, or other known electrical sensing techniques.

Self-threading action requires the use of air flow to direct the end of the tape from the supply reel to the take-up reel; and another aspect of the invention involves the provision of ducts and air directing vanes, integral with the main drive base plate casting, to direct air from the blower to control the free end of the tape and feed it onto the take-up reel. Air to the blower may be drawn in part from openings at the central hub of the take-up reel, to draw the end of the tape into engagement with this central hub, as part of the self-threading process.

The side walls of the air ducts, formed integral with the main base plate casting on both sides thereof, serve the collateral function of stiffening the main base plate, and make additional stiffening ribs, found in certain prior drives of this type, unnecessary; and they consume less vertical height than the larger separate ducts which were previously employed.

The use of a brushless DC motor for the blower motor has advantages in addition to saving space, in that the speed may be varied in the course of the threading cycle to enhance threading reliability. If the environmental temperature conditions are favorable, the blower, when in the cooling mode, may be operated at a low speed to reduce acoustic noise.

The relatively small size of the present unit is a significant advantage. Thus, as mentioned above, rack-mounted electronic equipment is normally 19 inches wide, and has a height which is measured in increments of $1\frac{3}{4}$ inch. The smallest commercially available units are $8\frac{3}{4}$ inches high (five increments). As compared with these currently available units, the tape drive of the present invention is only $5\frac{1}{4}$ inches high (three increments of $1\frac{3}{4}$ inches). This significant reduction of $3\frac{1}{2}$ inches from $8\frac{3}{4}$ inches to $5\frac{1}{4}$ inches is a reduction in volume of 40%. The reduction in height is accomplished in part by using the brushless DC reel motors which are virtually integral with the base plate, and by forming the air flow ducts integrally with the base plate casting, as discussed above, and by using a brushless DC blower drive motor. A flat horizontally extensive duct extending over the take-up reel hub to the intake of the blower, also contributes to the low profile of the unit. In addition, the use of the high-speed, microprocessor controlled, error detection and correction circuitry as disclosed in the above identified related patent application, reduces the complexity and space required for electronics in the drive unit.

The reduced size has resulted in a corresponding reduction in weight from over 100 pounds for prior comparable drives to less than 60 pounds for the present drive.

Other objects, features and advantages will become apparent from a consideration of the following detailed description and from the accompanying drawings.

DETAILED DESCRIPTION OF THE PREFERRED EMBODIMENT OF THE INVENTION

Figure 1:
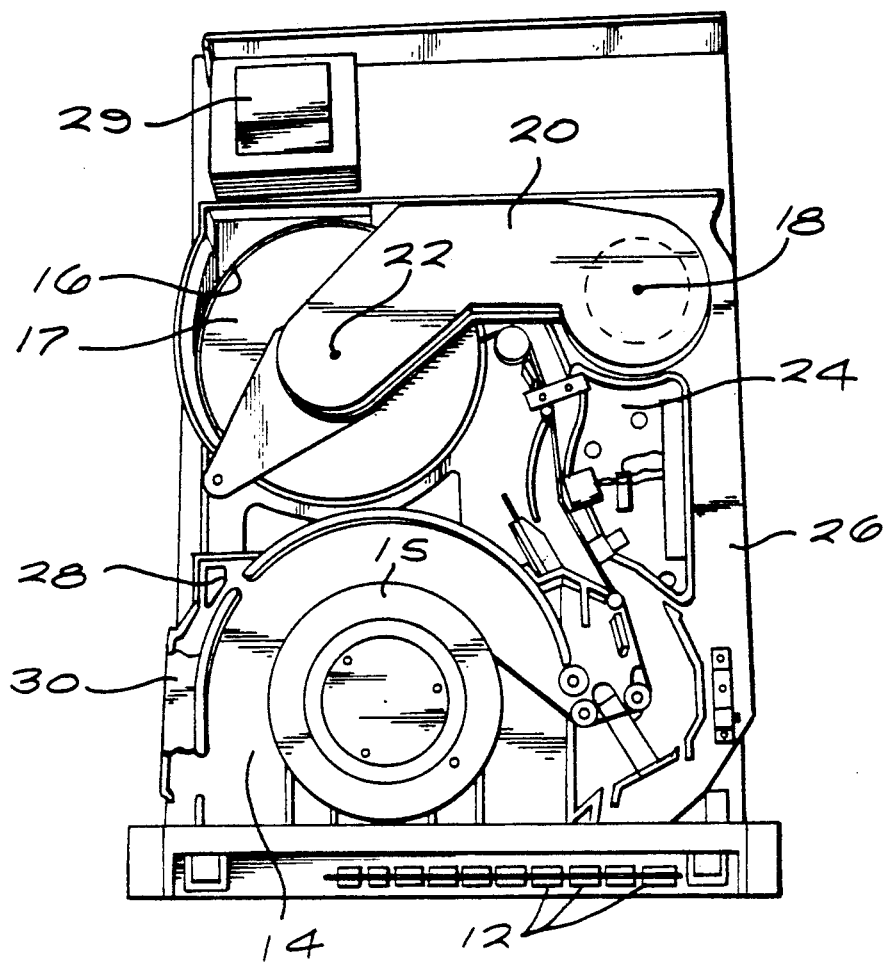
FIG. 1 is a top view of a high-speed, high-capacity tape drive, illustrating the principles of the present invention.

Referring more particularly to the drawings, FIG. 1 shows a tape drive illustrating the principles of the invention and including a front control panel 12, a space 14 for receiving a supply reel 15, and a space 16 to the rear of the unit where the take-up reel 17 is permanently mounted. A blower is located with its axis under point 18, at the right-hand side of the overlying duct 20.

The blower serves to both cool the tape drive equipment, and also plays an important part in the self-threading mode of operation of the tape drive. The blower, centered at point 18, is a centrifugal blower and draws air in from the center of the take-up reel 17, at its hub, which is centered at point 22. The hub is hollow, and has openings through it, so that the tape as it is fed to the vicinity of the hub of the take-up reel 17, in a manner to be disclosed in greater detail below, is drawn against this central hub of the take-up reel 17. The output from the blower below point 18 is directed through ducts formed by channels cast integrally with the base plate 24 of the drive unit, and covered with sheet metal, as indicated at reference number 26 extending along one side of the base plate 24 of the drive unit. Another channel extends along the bottom side of the base plate 24, utilizing a duct on the bottom side of the plate, and an opening 28 through the plate 24 as shown in FIG. 1 permits the flow of air through the duct 30 on the upper side of the plate 24. The flow of air in the course of the self-threading operation will be described in greater detail hereinbelow.

A rear panel carrying the power transformer 29 is mounted at the rear of the main assembly which includes base plate 24.

Figure 2:
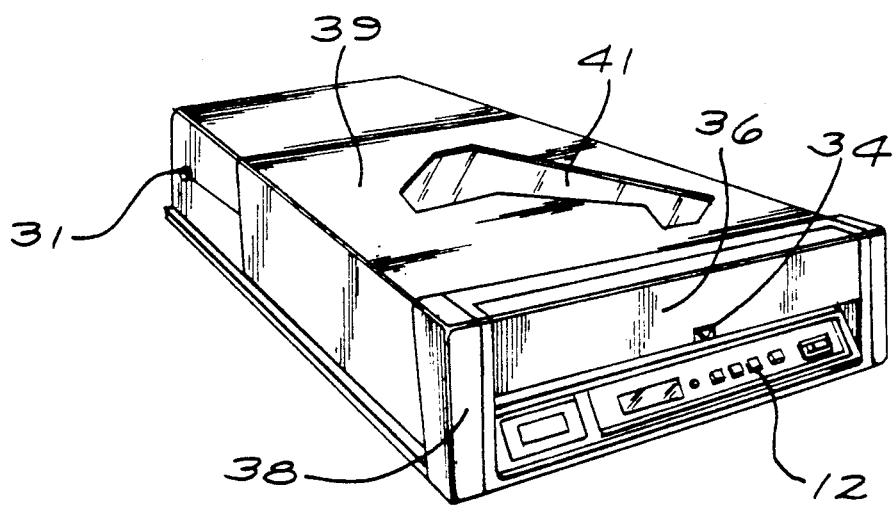
FIG. 2 is an isometric view of the tape drive of FIG. 1 showing its overall configuration for rack mounting.

FIG. 2 is an isometric view of the rack-mounted unit showing its relatively small vertical dimension of only 5¼ inches. The front control panel is shown at reference numeral 12, and the release 34 permits the pivoted upper panel 36 to swing away from the supporting frame 38, and permits the insertion and removal of supply reels containing the tape on which the digital information is stored. The top panel or cover 39 is provided with a transparent, plastic window 41 through which the self-threading operation may be observed.

Figure 3:
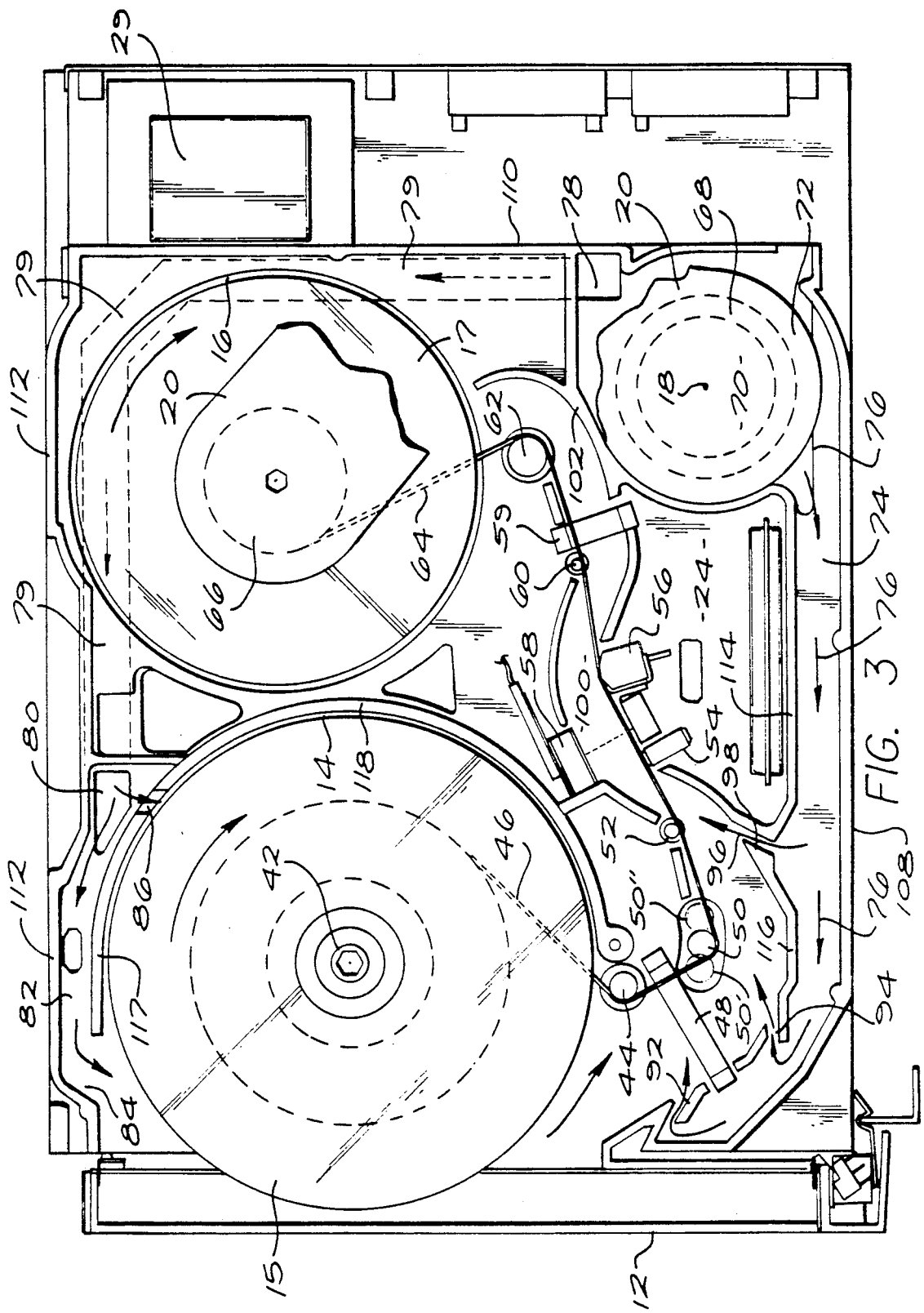
FIG. 3 is an overall schematic assembly view showing in some detail the construction and mode of operation of the system of the present invention.

FIG. 3 is a schematic top view of the layout of the drive unit, showing the relative position of the various parts in considerable detail. Initially it may be noted that point 18, which is the axis of rotation of the blower, is shown toward the lower right-hand side of the drawing, and that the control panel 12 is at the far left side of FIG. 3. The supply reel 15 is mounted on a central hub having an axis of rotation at point 42.

Now, considering the path of the tape from the supply reel 15 mounted in area 14 to the take-up reel mounted in area 16, the tape from the supply reel 15 initially passes over the roller 44, and may follow the path indicated at 46, or paths at slightly different angles, depending on the size of the tape reel in the area 14, and how much tape has been unwound from the supply reel onto the take-up reel. From the first roller 44, the tape extends past photoelectric sensor 48, over the tensioning arm roller 50, the position of which may shift as indicated by the reference numeral 50' or 50", depending on the position of the tensioning arm as required to take up slack and maintain proper tension in the tape. From the tension arm roller 50, the tape extends over the guide member 52 past the tape cleaner assembly 54 and over the read/write head assembly 56. An optical end-of-tape sensor assembly 58 is provided, and it senses a reflecting member near the end of the tape, which provides a signal for the microprocessor which controls the mode of operation of the system.

From the read/write heads 56, the tape extends past the guide member 60, around the roller 62 past the second "tape-in-path" sensor 59, and along the path indicated by the line 64 to the take-up hub 66 of the take-up reel 17 mounted in area 16. The hub 66 has openings through it, and the center of the hub 66 is coupled to the duct 20, as indicated in FIG. 1 of the drawings. The hub 66 may be solid in its lower half, and may be "castellated," or have successive small cutaway rectangular openings on its upper half, through which air is drawn, so that the tape will be drawn up against the hub 66 during the initial self-threading operation. As mentioned above, the blower 68 may be a centrifugal blower having its central axis at 18, and draws air in at its central area 70, and blows air out under high pressure outside its periphery indicated by the reference numeral 72. Air from the blower is directed through the duct 74 as indicated by arrows 76, and down through the opening 78 through the base plate 24 of the unit. The opening 78 is coupled by a duct 79 extending along the bottom of the base plate to the opening 80 at the upper portion of FIG. 3, slightlu to the left of center. From the opening 80, air is directed through the duct 82 and out through the opening 84, as well as directly out through the opening 86 into the area 14 where the supply reel is mounted.

It is interesting to note the manner in which the air from the blower 68 aids in the self-threading operation. Initially, it may be noted that the supply reel is wound clockwise, with the data on the inner surface of each turn of the tape. To start, with the supply reel in the area 14 rotating, after it has been initially inserted, air from vent openings 84 and 86 at the upper left-hand portion of FIG. 3, as well as from the vent openings 92 and 94 at the lower left-hand side of FIG. 3, will direct the tape, as indicated at 46, around the roller 44 and the roller 50 on the tension arm, into the area 96. An air jet from the vent opening 98 will then continue the threading process and route the tape through the area 100, past the tape cleaner unit 54, the end of tape sensor 58, and past the read/write heads 56 and the guide 60. The curved wall 102 will direct the tape around the roller 62 into the vicinity of the take-up reel, with its apertured hub 66, and the tape will be drawn into engagement with the hub, which is rotated to complete the self-threading operation.

Concerning the structural configuration of the base plate, it is formed as an aluminum casting and has a U-shaped peripheral edge extending around three sides, at reference numerals 108, 110 and 112. To form the air duct 74, additional walls 114 and 116 are cast, parallel to and spaced from the wall 108, and forming an integral part of the base plate. Similarly, on the far side, adjacent the wall 112, is provided an additional cast, integral wall 117 which provides an inner wall for the duct 82. The ducts 74 and 82 are enclosed by sheet metal strips as shown in FIG. 1. The arcuate shaped wall 118 extends transversely across the upper surface of the base plate, and separates the supply reel zone 14 from the take-up reel zone 16, and from the other components such as the blower, on the upper surface of the main base plate.

Incidentally, the power transformer 29 is mounted on the assembly, to the rear of the main base plate, as mentioned above.

Concerning a minor point, the supply reel may have different diameters such as 6 inches, 7 inches, 8½ inches and 10½ inches. A smaller reel is shown in FIG. 1 and a larger reel is shown in FIG. 4.

Figure 4:
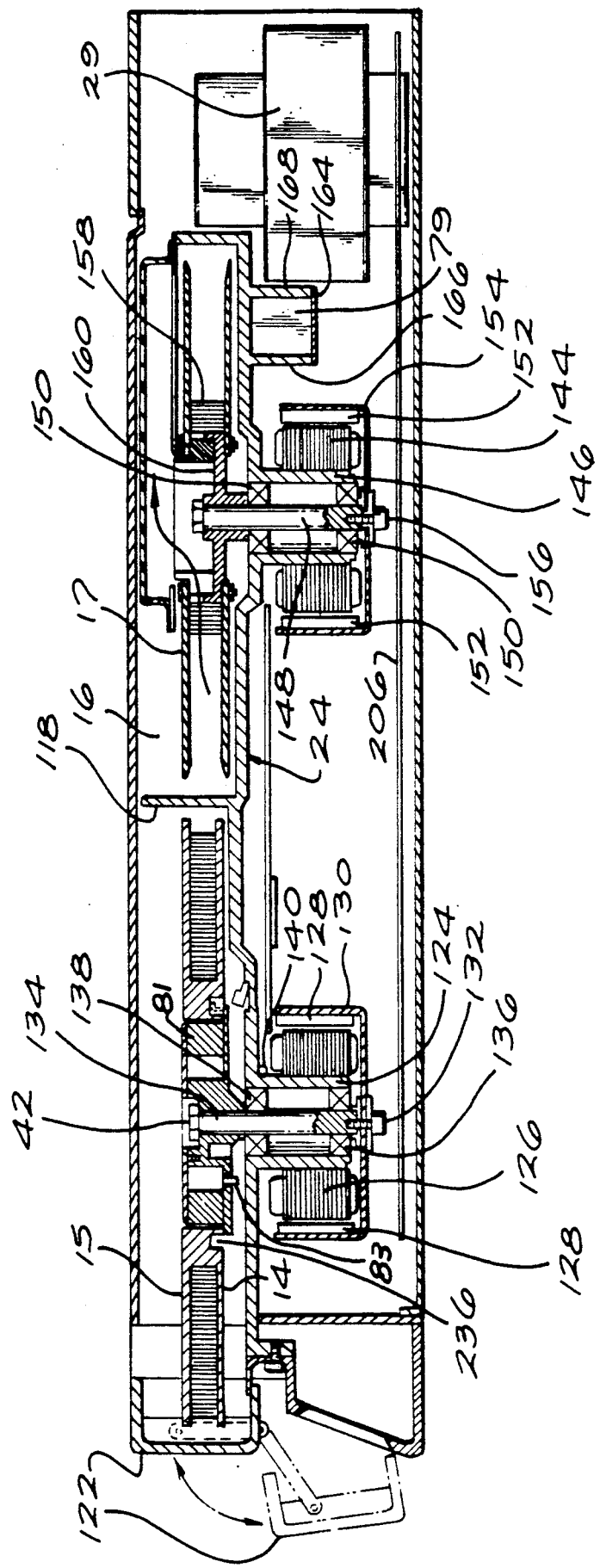
FIG. 4 is a cross-sectional view taken through the supply and the take-up reels of FIG. 3.

Turning now to FIG. 4 of the drawings, it is a cross-sectional view through the supply reel 15 and the take-up reel 17. The main base plate 24 extends across through the upper center of the unit, and it is slightly lower in the vicinity of the supply reel 15 in area 14, in order to easily permit the insertion and removal of the reel 15, with the fingers extending under the reel, when the access door 122 is opened.

Consideration will now be given to the mode of mounting the motors for the supply reel 15, the take-up reel 17, and the blower 68 (see FIG. 5). Initially, attention will be directed to the supply reel motor which has its center at point 42, as mentioned above. Associated with the motor is a short downwardly extending tube 124 which is cast integrally with the main base plate 24. The stator 126 of a brushless DC motor is mounted directly on the short downwardly extending tube 124. The tube 124 is externally machined and grooved, and corresponding protrusions on the inner surface of the stator 126 will properly orient the stator 126, and it is then affixed by suitable threaded fasteners to the tube 124. A permanent magnet rotor 128 is mounted on a cup-shaped support 130 which is, in turn, secured by the fastener 132 to the main drive shaft 134 of the supply reel motor assembly. Bearings 136 and 138 are mounted by retaining rings, or other suitable arrangements, on the inner surface of the downwardly extending tube 124. The motor, including stator 126 and the permanent magnet rotor 128, is brushless and the position of the rotor may be sensed in any known manner, for example by Hall effect sensors 140 mounted immediately above the periphery of the stator 126.

The drive motor for the take-up reel 17 in area 16 is similar to the construction described above for the supply reel motor, with the stator 144 being mounted on the outer surface of the downwardly extending short tube 146, and the drive shaft 148 being rotatably mounted on bearings 150 mounted on the inner surface of the integral tube 146. Similarly, the permanent magnet rotor 152 is mounted on the cup-shaped support member 154, secured by bolt 156 to drive shaft 148.

Incidentally, the tape 158 is shown within the reel 17 in FIG. 4. The take-up reel 17 is permanently mounted to the drive shaft 148 by suitable fasteners, and the intermediate ring-shaped support member 160.

Extending along near the rear of the base plate 24 is the channel or duct 79 formed by the two depending walls 166 and 168 which are cast integrally with the main base plate 24. As mentioned above, the air duct 79 runs from the hole 78 in the blower area around to the opening 80 (see FIG. 3), with these openings extending through the main surface of the base plate. The channel 79 as shown in FIGS. 3 and 4 is part of the duct which extends from the opening 78 to the opening 80, channeling air to the other corner of the drive assembly. The duct 79 is closed at its lower surface by one or more sheet metal strips 164.

Concerning the hub 81, it is approximately 3.7 inches in diameter, and the reel 15 makes a slip fit over the hub. The hub includes over-center outwardly extending gripping arrangements which make firm engagement with the inner surface of the reel. These gripping arrangements (not shown) are actuated when the downwardly extending pin 83 is briefly blocked by linkage attached to a solenoid, actuated during the start-up procedure, and the supply reel motor is pulsed to cause relative movement of part of a mechanism in the hub, which actuates the over-center gripping arrangements. The solenoid is then released, to free the hub and reel for rotation.

Figure 5:
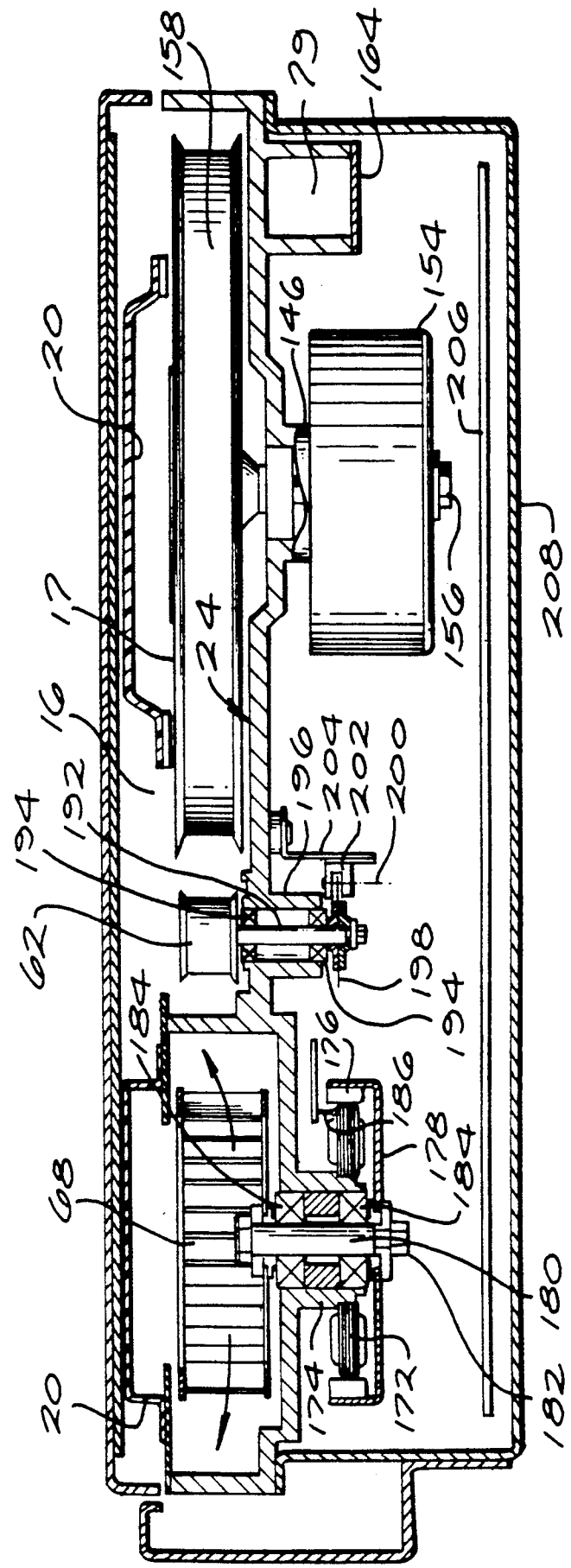
FIG. 5 is a transverse cross-sectional view taken through the blower and the take-up reel of FIG. 3.

Referring now to FIG. 5 of the drawings, it is a partial cross-sectional view through the centrifugal blower 68 and the take-up reel 17. In FIG. 5, the outer surface of the cup-shaped armature support 154 is shown, along with the fastener 156 and the upper portion of the downwardly-extending tube 146. This assembly is shown in detail in FIG. 4, at the righthand side of the center thereof.

To the left in FIG. 5 is shown the blower 68 with its motor including the stator 172 mounted on the downwardly-extending short tube 174, and the permanent magnet rotor 176 mounted on a cup-shaped support member 178 secured to the blower drive shaft 180 by the fastener 182. The drive shaft 180 is supported on the inner surface of the downwardly-extending tube 174 by bearings 184. Hall effect sensors 186 are employed to sense the position of the permanent magnet rotor 176, and to change the energization of the stator 172, in a manner known for brushless DC motors. The speed of the blower 68 may, of course, be changed by changing the voltage applied to the field windings on the stator 172.

Tachometer arrangements are provided for measuring the speed of movement of the tape, and these are associated with the roller 62, shown in FIG. 3 and in FIG. 5. The tape roller 62 is mounted on shaft 192, which is in turn supported by the bearings 194 on the inner surface of the downwardly depending tube 196, cast integral with the main base plate 24. A thin disc 198 having teeth or radial slots on its outer edge serves to interrupt a light path indicated schematically by the dashed lines 200, and involving a light-emitting diode and a photodetector mounted on the U-shaped bracket 202 which is, in turn, supported from the base plate 24 by the L-shaped support member 204. Pulses from the photodetector are supplied to the system control microprocessor to indicate the tape speed.

A printed circuit board 206 is shown schematically just above the lower wall 208 of the housing enclosing the streaming tape system of the present invention. The electronic systems of the tape drive system are mounted principally on the printed circuit boards such as 206.

Figure 6:
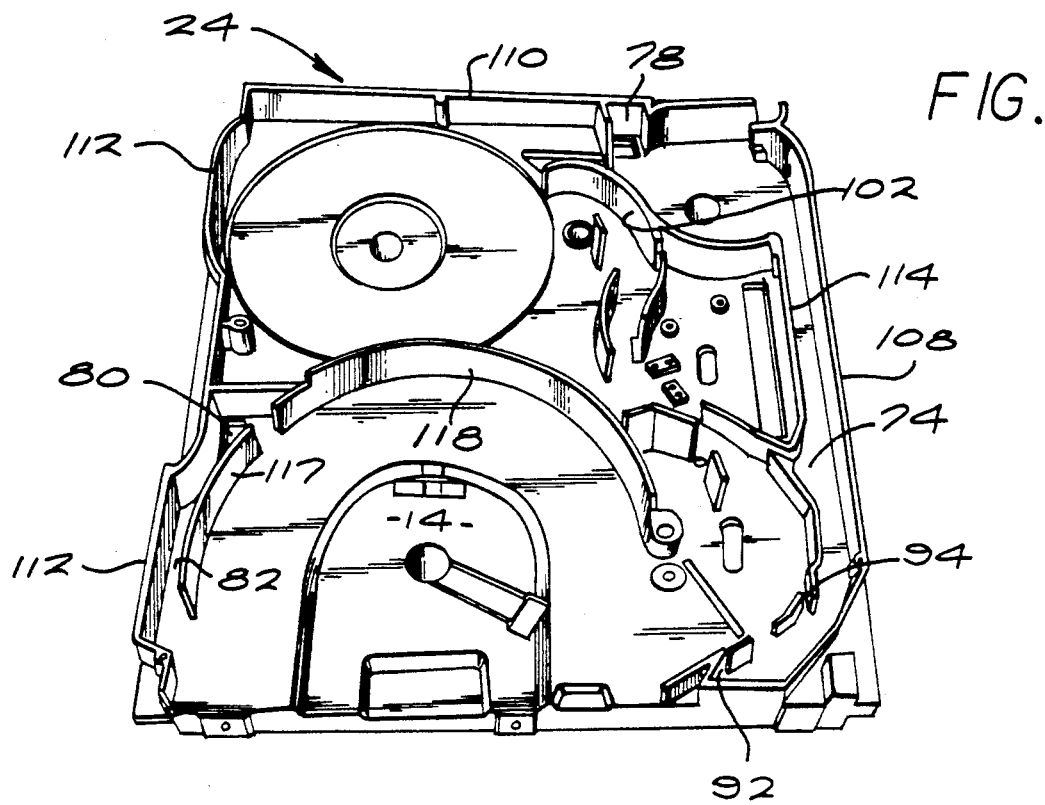
FIG. 6 is an isometric view of the top side of the central base plate of the tape drive storage system of FIG. 1.
Figure 7:
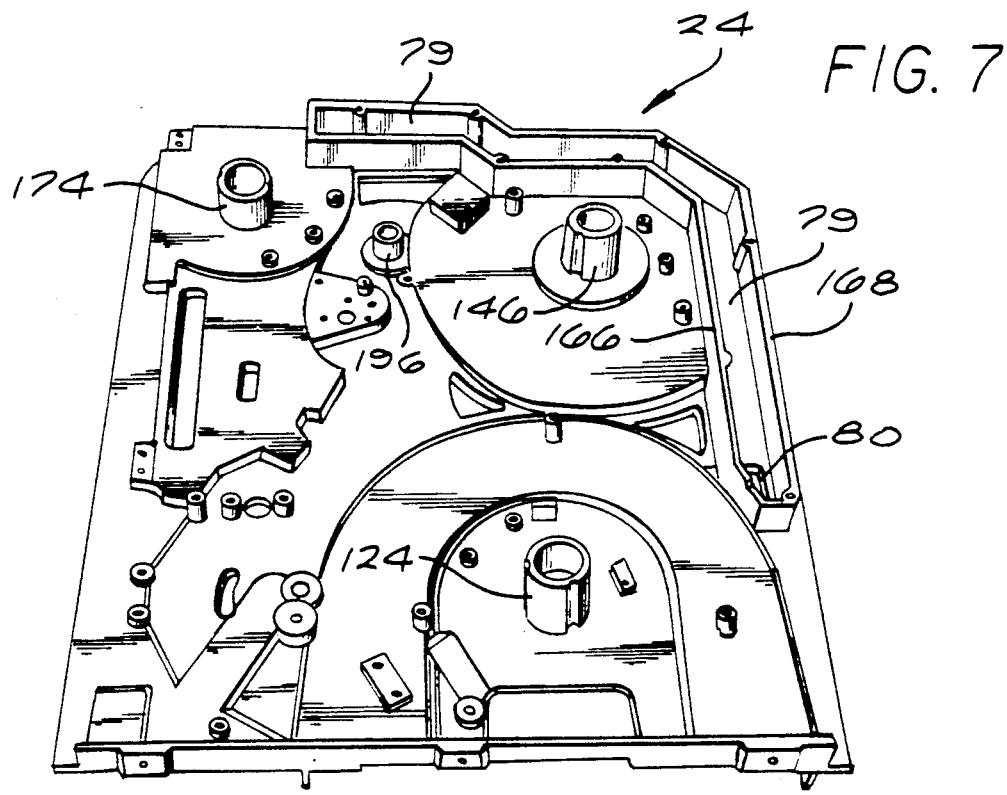
FIG. 7 is an isometric view of the lower side of the central base plate.

In view of the importance of the configuration of the main base plate in the present invention, FIGS. 6 and 7 show the top and bottom, respectively, of the main base plate 24, with no extra equipment associated therewith. In FIG. 6, the three outer walls 108, 110 and 112 are clearly visible, and the air duct 74 formed by the wall 114, in combination with the outer wall 108 and base plate 24, is also visible. The air duct is completed by a sheet metal strip, not shown in FIG. 6. On the other side of the base plate, to the left in FIG. 6, the duct 82, formed between the outer wall 112 and the inner adjacent wall 117, is also apparent. The two holes 78 and 80, which direct air from the blower to the channel 82, via the duct 79 (see FIG. 5), are also visible in FIG. 6.

FIG. 7 shows the bottom of the base plate 24, with the three motor mount tubes 174, 146 and 124 being clearly visible. In addition, the hub 196 for mounting the roller and tape tachometer assembly appears between the two downwardly-depending motor mount tubes 146 and 174. Also shown in FIG. 7 is the duct 79, formed by the two walls 166 and 168, with the overlying sheet metal material not being shown in this figure.

Figure 8:
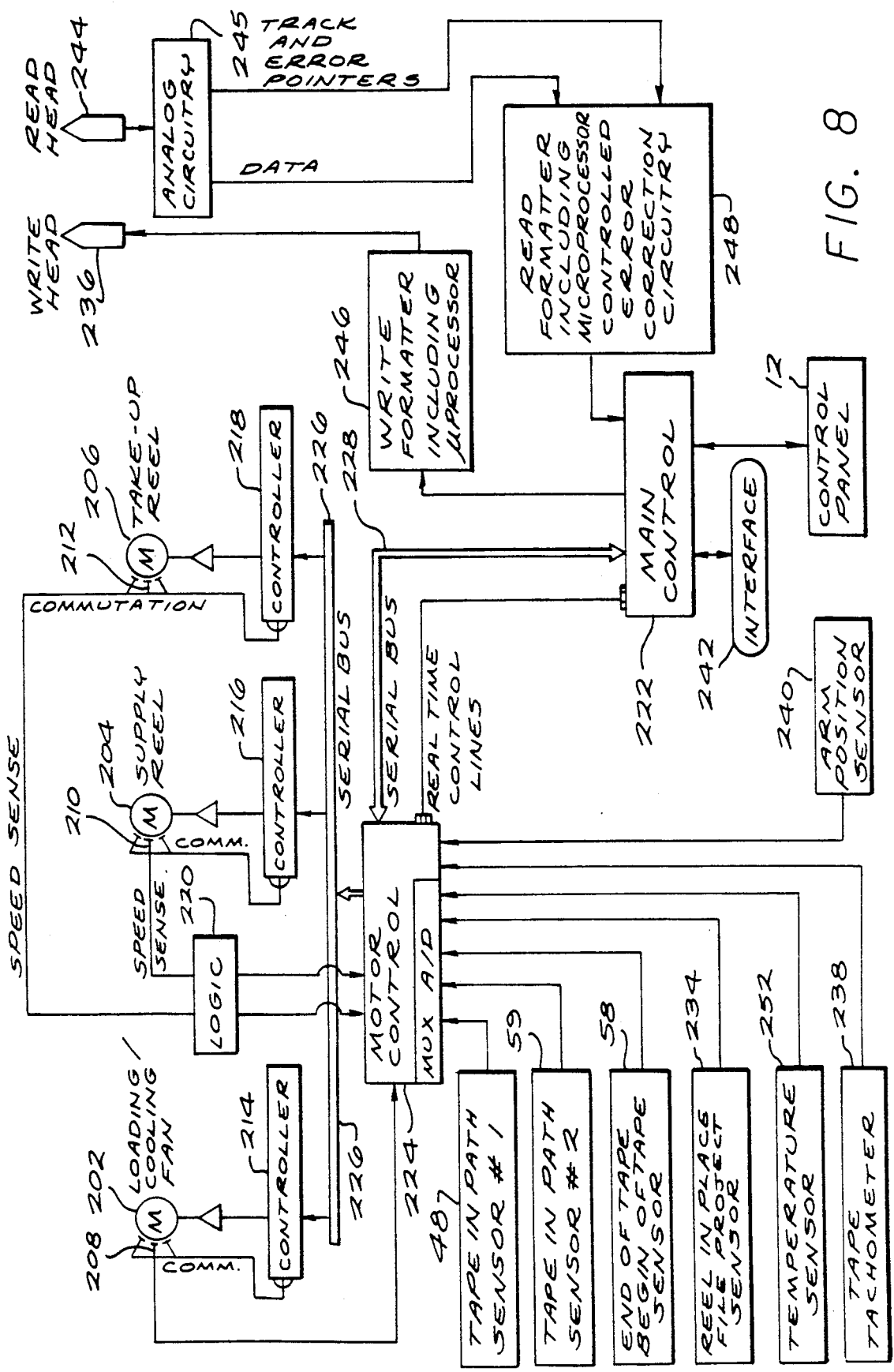
FIG. 8 is a block circuit diagram which may be employed in the implementation of the tape drive system.

Referring now to FIG. 8 of the drawings, the three motors are shown at the top of the drawing, with the cooling fan motor 202 being shown to the left, the supply reel motor 204 being shown toward the center, and the take-up reel motor 206 being shown to the right in this figure. Each of the motors has Hall effect sensors 208, 210, and 212, respectively, associated with them, and has stator coil energization controller circuitry 214, 216, and 218 associated, respectively, with the three motors. Logic circuitry 220 is coupled to receive signals from the Hall effect sensors, so that the relative speeds of rotation of the supply and take-up reels may be calculated and the moments of inertia of each reel calculated, so that appropriate power may be applied to each reel to accelerate them at the desired rates. The main microprocessor control circuit is indicated at reference numeral 222, and the motor control microprocessor is indicated at block 224. Signals from the motor control circuitry 224 are applied to the motor controllers 214, 216, and 218, via the serial digital bus 226. Similarly, the bus 228 intercouples the main control circuitry and the motor control circuitry. Inputs to the motor control circuitry include the two "tape-in-path" sensors 48 and 59 (see FIG. 3), and the sensor 58 which determines the end of the tape and the beginning of the tape, as indicated at reference numeral 58. In this regard, the tapes have reflecting stickers for areas on the upper and lower portions of the tapes, respectively, to indicate the beginning and the ending of the tape, respectively, with these reflecting portions being located approximately 20 feet from the ends of the tape. The next input to the motor control circuit 224 is the "reel in place/file protect, sensor," indicated at block 234. Referring back to FIG. 4, it may be noted that the supply reel 15 has a circumferential recess 236 on the bottom of the reel adjacent the central opening through the reel. This opening may receive a plastic ring, and the presence or absence of the plastic ring controls the inhibition of the write heads 236, so that the information recorded on the tape may not be changed. The presence or absence of the ring is sensed by known electro-mechanical arrangements, and this function is indicated by the block 234.

The speed of the tape is indicated by the tape tachometer block 238, implemented as discussed hereinabove in connection with FIG. 5, roller 62, and the associated sensing arrangements.

The roller 50, as shown in FIG. 3, may be moved to the left or right, as indicated in FIG. 3 by the references numerals 50' and 50", by the actuation of an arm, not shown, on which the roller 50 is mounted. The position of this arm is sensed by the arm position sensor 240, and this information is supplied to the motor control circuitry 224.

Referring now to the other circuitry associated with the main control 222, the host computer interface 242 may be noted, and this connects the streaming drive system with the data processing system from which information is received and to which the digital information stored in the streaming tape drive is supplied. The write head 236 was mentioned hereinabove, and the read head 244 is mechanically associated with the write head or heads 236. When digital signals are to be stored on the tape, certain parity and other check digits are also recorded on the tape, and this is accomplished by the write formatter, including a microprocessor, as indicated at reference numeral 246 in FIG. 8. Similarly, when digital information is read from the tape by the read head or heads 244, it is processed by the analog circuitry 245, and the read formatter including microprocessor controlled error correction and detection circuitry as indicated by block 248. As mentioned above, this circuitry is of the type disclosed in the prior related patent application cited hereinabove. Incidentally, when reference is made in the present patent application to a read formatter including microprocessor controlled error correction and detection circuitry, reference is being made to a system as disclosed in the above-identified related patent application.

A temperature sensor 252 is also provided to indicate the ambient temperature. When the ambient temperature reaches undesired elevated temperatures, the blower motor speed is increased to avoid overheating of the system; and when lower ambient temperatures are present, the blower may be operated at lower speeds to avoid acoustic noise.

In passing, it may be noted that the brushless D.C. reel motors are in the order of two or two and one-half inches in height, and certainly less than three inches in height, as compared with the typical 5 inch long brush type motors having equivalent torque, characteristically used in prior drives of this type. Instead of using stators and rotors mounted on downwardly depending tubes, complete brushless D.C. motors, of dimensions similar to those of the present motors, could be secured to the base plate 24, with their drive shafts extending up through the base plate. Similarly, instead of forming the air ducts with integral cast walls, two, three, or four of the walls could be formed of sheet metal or sheet plastic, and some of the benefits of the present invention could be obtained. However, the arrangements as shown and described herein, with integral depending motor mount tubes and integral duct walls, make for a more solid, vibration-free, lower cost, and reliable assembly and system.

It is noted in passing that brushless D.C. tape drive motors were previously used in lower speed tape drives having an upright configuration, and horizontal axes for the tape reels, and these have been publicly sold for more than one year. These units had a main vertical support plate and the drive motors for the reels were mounted on short tubes integral with and extending horizontally from the main vertical support plate. However, in accordance with the present design, as discussed in detail hereinabove, a high-speed, high-density, rack-mounted, streaming tape drive has a main horizontal base plate, and uses brushless D.C. motors mounted below the base plate, together with other constructional and system features to achieve a unique 5-¼ inch height, and a weight substantially below sixty pounds.

It is to be understood that the foregoing detailed description and the accompanying drawings relate to one illustrative embodiment of the invention. Various changes and modifications may be made without departing from the spirit of the invention. Thus, by way of example and not of limitation, the duct 79 could follow a different path from opening 78 to opening 80; and the duct 74 could extend under the base plate 24 in the manner of duct 79 for a portion of its extent. In addition, instead of having outer rotors, the brushless D.C. motors could have internally mounted rotors, with larger diameter depending tubes to accommodate both the stator and rotor, and with the drive shaft having an upper bearing mounted in the base plate in an opening having a diameter substantially less than that of the associated depending tube on which the motor would be mounted; and the lower bearing would then be mounted on the stator. Accordingly, it is to be understood that the present invention is not limited to the precise arrangements as shown in the drawings and described in the foregoing detailed description.

What is claimed is:

1. A low profile, high-capacity tape drive system of the rack-mounted type, comprising:
   a main base plate;
   a blower;
   a take-up reel, said take-up reel having a central hub;
   hub means for receiving a supply reel;
   means including a first brushless DC motor for rotatably driving said take-up reel;
   a second brushless DC motor for driving said hub means and an associated supply reel;
   a third brushless DC motor for rotating said blower;
   each of said motors having a stator, a permanent magnet rotor, and a central drive shaft;
   said main base plate having first, second, and third short, downwardly extending, integral tubes for mounting said first, second and third motors;
   means for mounting the stator of each of said motors on the outer surface of one of said tubes;
   bearing means for supporting the drive shaft of each of said motors from the inner surface of one of said tubes;
   means for mounting each of said permanent magnet rotors from the lower end of said drive shaft, and in coupling proximity with said stator;
   means including a tape drive enclosure for automatically threading tape from a supply reel mounted on said supply reel hub onto said take-up reel, said threading means including air ducts integral with said base plate on the upper and lower surfaces thereof for directing air from said blower to blow the end of a tape from a supply reel into engagement with the hub of said take-up reel; and
   said hub of said take-up reel having openings in it coupled to the intake of said blower, and constituting means for holding the end of the tape onto said hub of said take-up reel.

2. A tape drive system as defined in claim 1 wherein the height of said tape drive is less than six inches, and the weight of said tape drive is less than sixty pounds.

3. A tape drive system as defined in claim 1 wherein digital signal processing means are provided using high-speed, dedicated, microprocessor controlled architecture for detecting and correcting errors in recorded data in said system, to reduce the complexity, size and weight of the required associated electronics.

4. A tape drive system as defined in claim 1 further including a roller for guiding the tape between said reels, said roller being mounted on a shaft which in turn is mounted on bearings mounted on an additional downwardly depending short tube cast integral with said base plate, and tachometer means coupled to said drive shaft below said base plate to sense the tape speed.

5. A tape drive system as defined in claim 1 wherein said base plate includes at least one hole through the base plate for coupling air from said blower to a first duct below said base plate, and a second hole through said base plate for coupling air from said first duct to a second duct above said base plate.

6. A tape drive system as defined in claim 1 further comprising a flat, horizontally extensive duct extending over the hub of said take-up reel and over the blower to the intake thereof, to draw said tape to said hub, said duct being mounted above said base plate on the same side thereof as said supply and take-up reels.

7. A low profile, high-capacity tape drive system of the rack-mounted type, comprising:
   a main base plate;
   a blower;
   a take-up reel, said take-up reel having a central hub;
   hub means for receiving a supply reel;
   means including a first brushless DC motor for driving said take-up reel;
   a second brushless DC motor for driving said hub means and an associated supply reel.
   each of said motors having a stator, a permanent magnet rotor, and a central drive shaft; and having an axial height of less than three inches;
   means for mounting said motors in immediate proximity below said main base plate; and
   means including a tape drive enclosure for automatically threading tape from a supply reel mounted on said supply reel hub onto said take-up reel, said threading means including air ducts in immediate proximity to the upper and lower surfaces of said base plate for directing air from said blower to blow the end of a tape from a supply reel into engagement with the hub of said take-up reel.

8. A tape drive system as defined in claim 7 wherein the height of said tape drive is less than six inches, and the weight of said tape drive is less than sixty pounds.

9. A tape drive system as defined in claim 7 wherein digital signal processing means are provided using high-speed, dedicated, microprocessor controlled architecture for detecting and correcting errors in recorded data in said system, to reduce the complexity, size and weight of the required associated electronics.

10. A tape drive system as defined in claim 7 wherein said base plate includes at least one hole through the base plate for coupling air from said blower to a first duct below said base plates, and a second hole through said base plate for coupling air from said first duct to a second duct above said base plate.

11. A tape drive system as defined in claim 7 wherein said hub has openings in it, and further comprising a flat, horizontally extensive duct extending over the hub of said take-up reel and over the blower to the intake thereof, to draw said tape to said hub, said duct being mounted above said base plate on the same side thereof as said supply and take-up reels.

12. A low profile, high-capacity tape drive system of the rack-mounted type, comprising:
a main base plate;
a blower;
a take-up reel, said take-up reel having a central hub;
hub means for receiving a supply reel;
means including a first brushless DC motor for driving said take-up reel;
a second brushless DC motor for driving said hub means and an associated supply reel;
a third brushless DC motor for rotating said blower;
each of said motors having a stator, a permanent magnet rotor, and a central drive shaft;
said main base plate having first, second and third short, downwardly extending, integral tubes for mounting said first, second and third motors;
means for mounting the stator of each of said motors on the outer surface of one of said tubes;
bearing means for supporting the drive shaft of each of said motors from the inner surface of one of said tubes;
means for mounting each of said permanent magnet rotors from the lower end of said drive shaft, and in coupling proximity with said stator;
means including a tape drive enclosure for automatically threading tape from a supply reel mounted on said supply reel hub onto said take-up reel, said threading means including air ducts adjacent at least one surface of said base plate for directing air from said blower to blow the end of a tape from a supply reel into engagement with the hub of said take-up reel; and
said hub of said take-up reel having openings in it coupled to the intake of said blower, and constituting means for holding the end of the tape onto said hub of said take-up reel.

13. A tape drive system as defined in claim 12 wherein the height of said tape drive is less than six inches, and the weight of said tape drive is less than sixty pounds.

14. A tape drive system as defined in claim 12 wherein digital signal processing means are provided using high-speed, dedicated, microprocessor controlled architecture for detecting and correcting errors in recorded data in said system, to reduce the complexity, size and weight of the required associated electronics.

15. A tape drive system as defined in claim 12 further including a roller for guiding the tape between said reels, said roller being mounted on a shaft which in turn is mounted on bearings mounted on an additional downwardly depending short tube cast integral with said base plate, and tachometer means coupled to said drive shaft below said base plate to sense the tape speed.

16. A tape drive system as defined in claim 12 wherein said base plate includes at least one hole through the base plate for coupling air from said blower to a first duct below said base plates, and a second hole through said base plate for coupling air from said first duct to a second duct above said base plate.

17. A tape drive system as defined in claim 12 further comprising a flat, horizontally extensive duct extending over the hub of said take-up reel and over the blower to the intake thereof, to draw said tape to said hub, said duct being mounted above said base plate on the same side thereof as said supply and take-up reels.

18. A low profile, high-capacity tape drive system of the rack-mounted tape, comprising:
a main base plate;
a blower;
a take-up reel, said take-up reel having a central hub;
hub means for receiving a supply reel;
means including a first brushless DC motor for driving said take-up reel;
a second brushless DC motor for driving said hub means and an associated supply reel;
a third brushless DC motor for rotating said blower;
each of said motors having a stator, a permanent magnet rotor, and a central drive shaft and having an axial height of less than three inches;
means for mounting said motors in immediate proximity to and below said main base plate; and
means including enclosing structure for automatically threading tape from a supply reel mounted on said supply reel hub onto said take-up reel, said threading means including air ducts on the upper and lower surfaces thereof for directing air from said blower to blow the end of a tape from a supply reel into engagement with the hub of said take-up reel.

19. A tape drive system as defined in claim 18 wherein the height of said tape drive is less than six inches, and the weight of said tape drive is less than sixty pounds.

20. A tape drive system as defined in claim 18 wherein digital signal processing means are provided using high-speed, dedicated, dedicated microprocessor controlled architecture for detecting and correcting errors in recorded data in said system, to reduce the complexity, size and weight of the required associated electronics.

21. A tape drive system as defined in claim 18 wherein said base plate includes at least one hole through the base plate for coupling air from said blower to a first duct below said base plate, and a second hole through said base plate for coupling air from said first duct to a second duct above said base plate.

22. A tape drive system as defined in claim 18 wherein said hub has openings in it, and further comprising a flat, horizontally extensive duct extending over the hub of said take-up reel and over the blower to the intake thereof, to draw said tape to said hub, said duct being mounted above said base plate on the same side thereof as said supply and take-up reels.

* * * * *